US011927387B2

(12) United States Patent
Yi et al.

(10) Patent No.: US 11,927,387 B2
(45) Date of Patent: Mar. 12, 2024

(54) REFRIGERATOR

(71) Applicant: LG ELECTRONICS INC., Seoul (KR)

(72) Inventors: Youngho Yi, Seoul (KR); Byounghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 228 days.

(21) Appl. No.: 17/552,948

(22) Filed: Dec. 16, 2021

(65) Prior Publication Data

US 2022/0214101 A1 Jul. 7, 2022

(30) Foreign Application Priority Data

Jan. 6, 2021 (KR) ........................ 10-2021-0001534

(51) Int. Cl.

*B67D 3/00* (2006.01)
*F25D 23/02* (2006.01)
*F25D 23/12* (2006.01)

(52) U.S. Cl.

CPC ......... *F25D 23/126* (2013.01); *B67D 3/0025* (2013.01); *B67D 3/008* (2013.01); *F25D 23/028* (2013.01); *F25D 2323/02* (2013.01)

(58) Field of Classification Search

CPC .. F25D 23/126; F25D 23/028; F25D 2323/02; F25D 2323/122; F25D 21/04;

(Continued)

(56) References Cited

U.S. PATENT DOCUMENTS

2017/0350640 A1 12/2017 Pae
2018/0372397 A1 12/2018 Chae et al.
2020/0041188 A1 2/2020 You et al.

FOREIGN PATENT DOCUMENTS

CN 103673478 3/2014
CN 203771877 8/2014

(Continued)

OTHER PUBLICATIONS

English language machine translation of CH104713301 to Yang et al. (translated Sep. 2023) (Year: 2015).*

(Continued)

*Primary Examiner* — Cassey D Bauer
(74) *Attorney, Agent, or Firm* — KED & ASSOCIATES, LLP

(57) ABSTRACT

The present disclosure relates to a refrigerator, and the refrigerator includes a cabinet configured to form a storage space, a door configured to open and close the storage space, a dispenser configured to be formed on a front surface of the door, a water tank configured to be provided detachably from the door above the dispenser and including a drain port for discharging stored water, a pipe part configured to communicate with the water tank to form a passage for discharging water, and a water intake valve including a valve body that slides along the longitudinal direction of the pipe part and opens and closes an opening and closing surface of the pipe part, in which the valve body includes an extension part configured to extend from one surface of the valve body toward an inner surface of the passage, and a leak prevention ring configured to be provided around the extension part to seal between the pipe part and the valve body in a state where the opening and closing surface is closed by the valve body.

20 Claims, 7 Drawing Sheets

(58) Field of Classification Search
CPC ... F25D 2321/00; B67D 1/0082; B67D 3/008; B67D 3/0025; B67D 2210/00036
See application file for complete search history.

(56) References Cited

FOREIGN PATENT DOCUMENTS

| | | | | |
|---|---|---|---|---|
| CN | 104713301 | * | 6/2015 | ........... F25D 23/028 |
| EP | 3 252 405 | | 12/2017 | |
| EP | 3 604 992 | | 2/2020 | |
| KR | 10-1999-0004822 | | 1/1999 | |
| KR | 10-2017-0076208 | | 7/2017 | |
| KR | 10-2017-0136805 | | 12/2017 | |
| WO | WO 2015/144244 | | 10/2015 | |
| WO | WO2018/162027 | * | 9/2018 | ........... B67D 1/0082 |

OTHER PUBLICATIONS

Korean Office Action dated Apr. 28, 2022 issued in KR Application No. 10-2021-0001534.
European Search Report dated May 27, 2022 issued in EP Application No. 21215279.7.

* cited by examiner

REFRIGERATOR

CROSS-REFERENCE TO RELATED APPLICATION

This application claims priority under 35 U.S.C. § 119 to Korean Application No. 10-2021-0001534 filed on Jan. 6, 2021, whose entire disclosure is hereby incorporated by reference.

BACKGROUND

1. Field

The present disclosure relates to a refrigerator.

2. Background

In general, a refrigerator is a home appliance that can store food at a low temperature in an internal storage space that is shielded by a door. To this end, the refrigerator is configured to store the stored food in an optimal state by cooling the inside of the storage space using cold air generated through heat exchange with a refrigerant circulating in the refrigeration cycle.

As such, refrigerators are gradually becoming larger and more multifunctional in accordance with changes in dietary habits and the trend of luxury products, and refrigerators having various structures and convenience devices in consideration of user convenience are being released.

For example, in recent years, a refrigerator equipped with a dispenser for taking out water from a refrigerator door or an ice maker for making ice in a freezing chamber or a freezing chamber door is being developed. In addition, a water tank in which water supplied to the dispenser is stored may be detachably provided on the rear surface of the refrigerating chamber door.

In Korean Patent Laid-Open No. 10-1999-004822, a water dispenser for the refrigerator capable of external water supply is disclosed so that water can be replenished to a water tank mounted inside from the outside of the door without opening the refrigerator door by building a simple structure inside the wall surface of the refrigerator door.

Meanwhile, such a conventional refrigerator has a problem that dew condensation occurs around a valve body formed to take out water by being connected to a water tank under the influence of external temperature and humidity.

BRIEF DESCRIPTION OF THE DRAWINGS

Embodiments will be described in detail with reference to the following drawings in which like reference numerals refer to like elements, and wherein.

DETAILED DESCRIPTION

Hereinafter, specific embodiments of the present disclosure will be described in detail with reference to the drawings. However, the present disclosure cannot be said to be limited to the embodiments in which the spirit of the present disclosure is presented, and other disclosures that are degenerate by addition, changes, deletions, or the like of other elements or other embodiments included within the scope of the present disclosure can be easily suggested.

Figure 1:
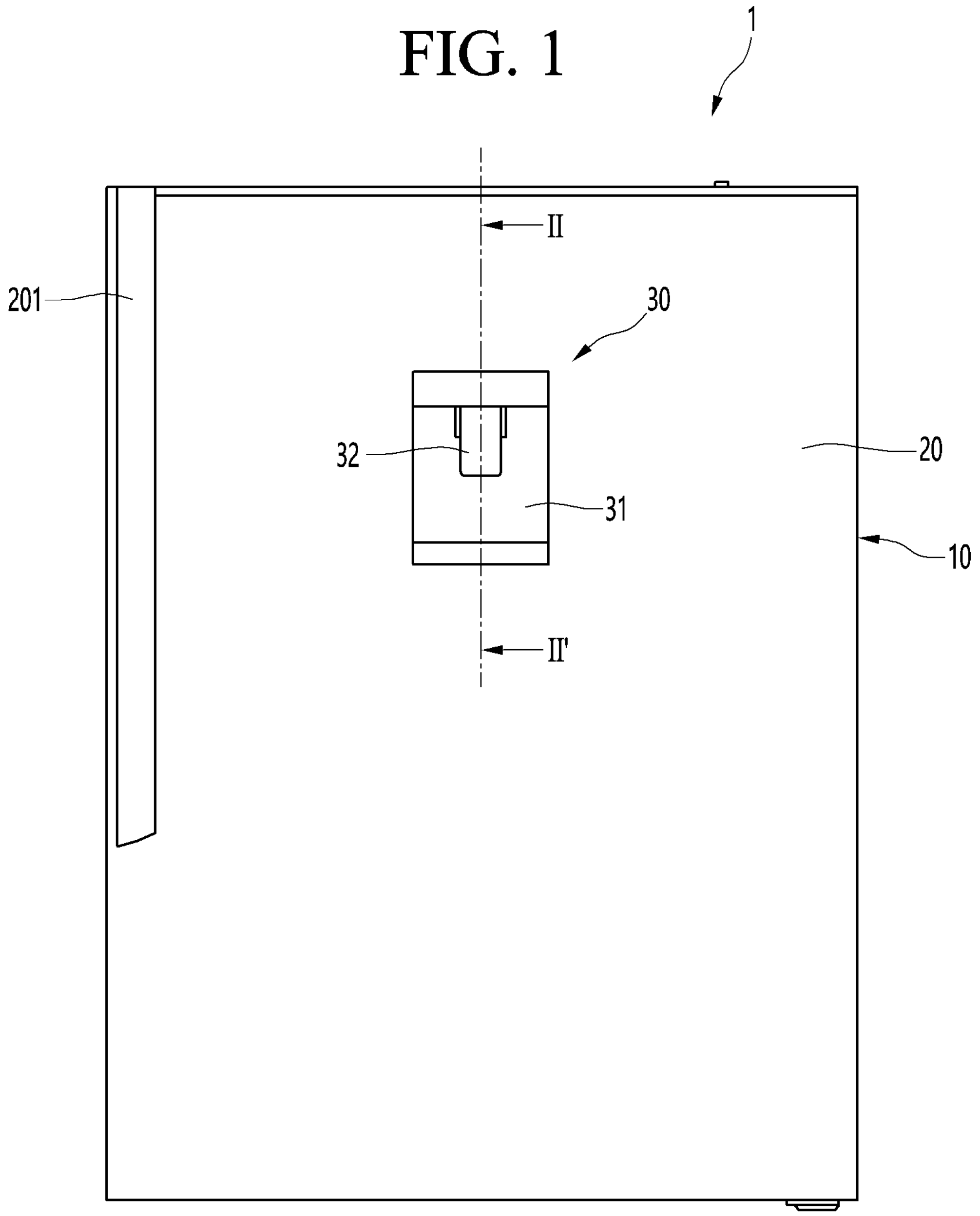
FIG. 1 is a front view illustrating a refrigerator according to an embodiment of the present disclosure.

FIG. 1 is a front view illustrating a refrigerator according to an embodiment of the present disclosure.

As illustrated in the drawing, the refrigerator 1 according to an embodiment of the present disclosure may include a cabinet 10 forming a storage space, and a door 20 disposed in front of the cabinet to open and close the storage space.

The door 20 may be disposed by being hinged with the cabinet 10 and may open and close the storage space by rotation. In addition, a handle 201 recessed inwardly on the front surface of the door 20 to allow a user to open and close the door 20 may be provided.

In addition, a dispenser 30 may be provided on the front surface of the door 20. The dispenser 30 allows a user to take out water by operating the dispenser from the outside, has a recessed part recessed from the front surface to the rear of the lower door 20, and can operate the take-out lever 32 from the inside so that the water is taken out.

In this embodiment, the refrigerator is described as an example of a refrigerator having a single door 20, but as an example, the cabinet may form a storage space partitioned up and down, and an upper door disposed above the cabinet and a lower door disposed below the cabinet may be provided, respectively, and the dispenser 30 is not limited to the position and shape of the door, and it should be noted in advance that it can be applied to various types of refrigerator doors.

Hereinafter, a dispenser provided in the door will be described in more detail with reference to the drawings.

Figure 2:
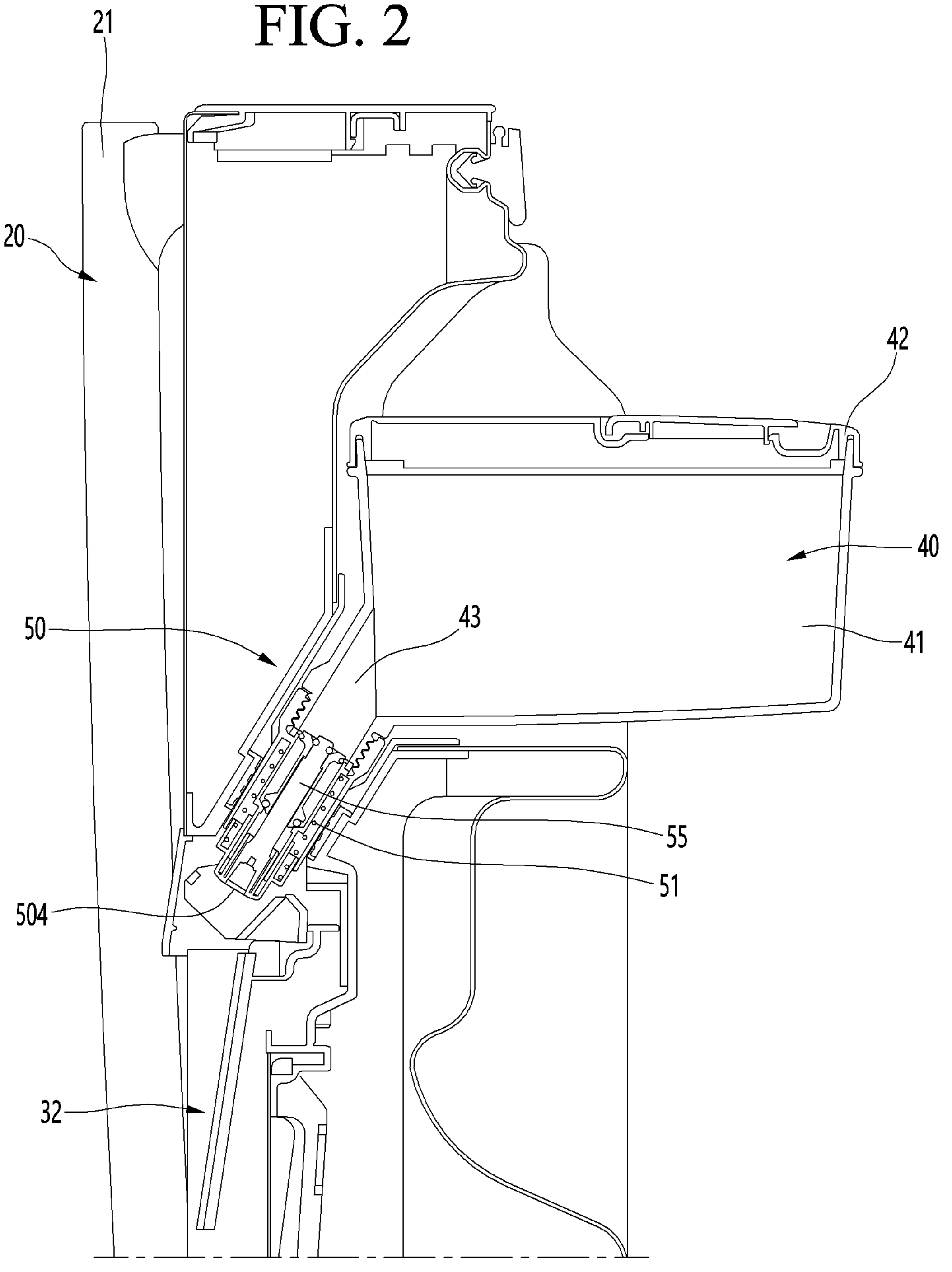
FIG. 2 is a cross-sectional view taken along line II-II' of FIG. 1.
Figure 3:
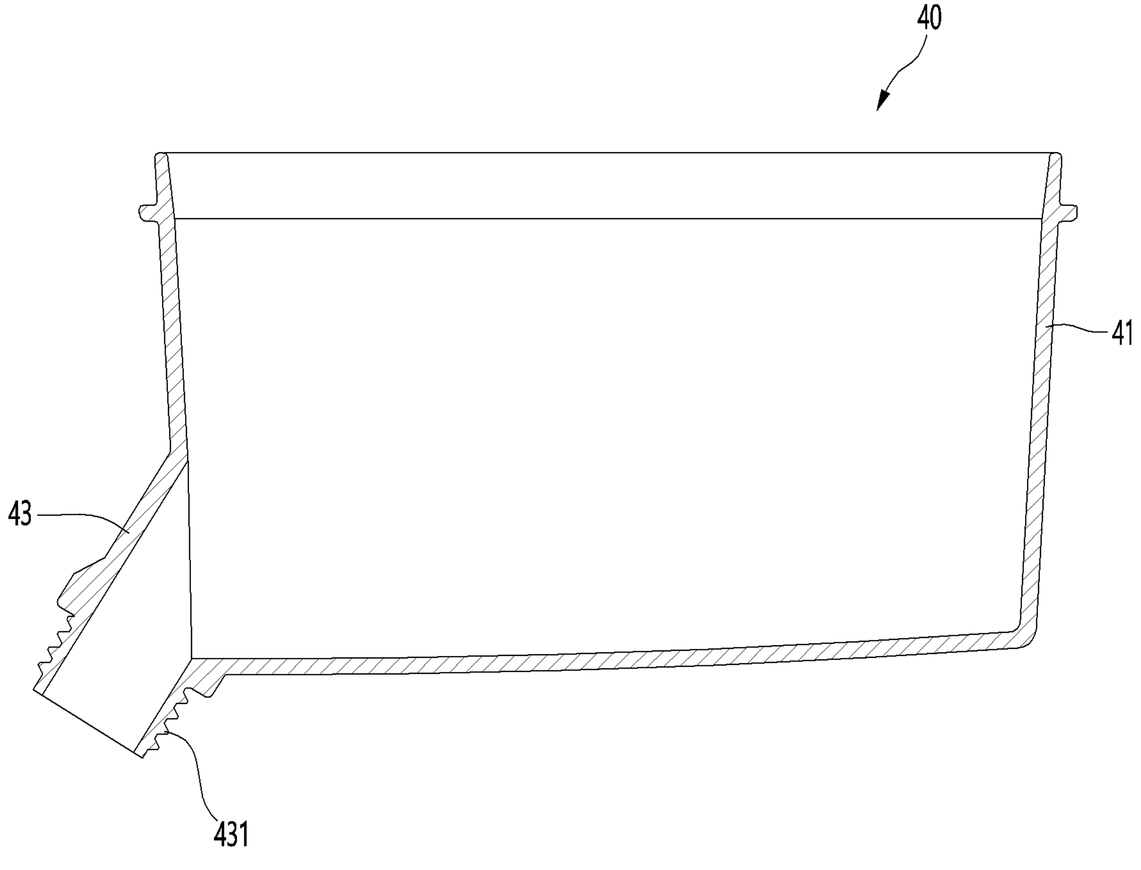
FIG. 3 is a side sectional view illustrating the structure of a water tank according to an embodiment of the present disclosure.

FIG. 2 is a cross-sectional view taken along line II-II' of FIG. 1 and FIG. 3 is a side sectional view illustrating the structure of a water tank according to an embodiment of the present disclosure.

As illustrated, the dispenser 30 is provided on the front surface of the door 20, and the water tank 40 is mounted on the rear surface of the door 20.

In detail, the door 20 may include a front plate that forms an outer appearance of the front surface of the door, and a door liner that is coupled to the front plate to form a rear surface of the door. A water tank 40 may be detachably mounted on the rear surface of the door 20.

The water tank 40 is for storing water supplied to the dispenser 30 and may be provided at the rear surface of the door 20. Accordingly, the water tank 40 may be located inside the refrigerating chamber and naturally cooled by the cold air inside the refrigerating chamber to provide cooled water to the dispenser 30.

The water tank 40 may be located above the dispenser 30, so that when the dispenser 30 is operated, the water inside the water tank 40 can be supplied to the dispenser 30 by its own weight.

The water tank 40 may include a tank body 41 in which water is stored, and a tank cover 42 that shields the opened upper surface of the tank body 41. At least a part of the tank body 41 may be made of a transparent material, and the user may easily check the amount of water stored in the water tank 40.

In addition, a drain port 43 may be provided at the lower end of the water tank 40. The drain port 43 may extend downward to allow the water of the water tank 40 to be taken out from the dispenser 30. In other words, when the water tank 40 is mounted on the door, the drain port 43 may extend toward the water take-out space while facing the front of the door.

The outer circumferential surface of the drain port 43 includes a valve coupling part 431 formed of a screw thread. For example, the valve coupling part 431 may be fastened to a screw thread mated with the coupling part 511 provided on the upper end of the pipe part 51 of the water take-out valve 50.

Of course, the outer circumferential surface of the drain port 43 may be formed in various shapes in which the drain port 43 can be inserted and fixed inside the pipe part 51 in addition to the screw thread, but is not limited thereto.

In addition, the valve coupling part 431 is in surface contact with a sealing part 512 to be described later. In other words, the sealing part 512 may be provided between the valve coupling part 431 and the fastening part 511. The sealing part 512 prevents the temperature of the drain port 43 cooled by the water of the water tank 40 from being conducted to the fastening part 511, thereby being capable of preventing the temperature of the valve body 55 from being lowered. Accordingly, it is possible to prevent dew condensation from forming around the valve body 55.

Hereinafter, a water take-out valve according to an embodiment of the present disclosure will be described in detail.

Figure 4:
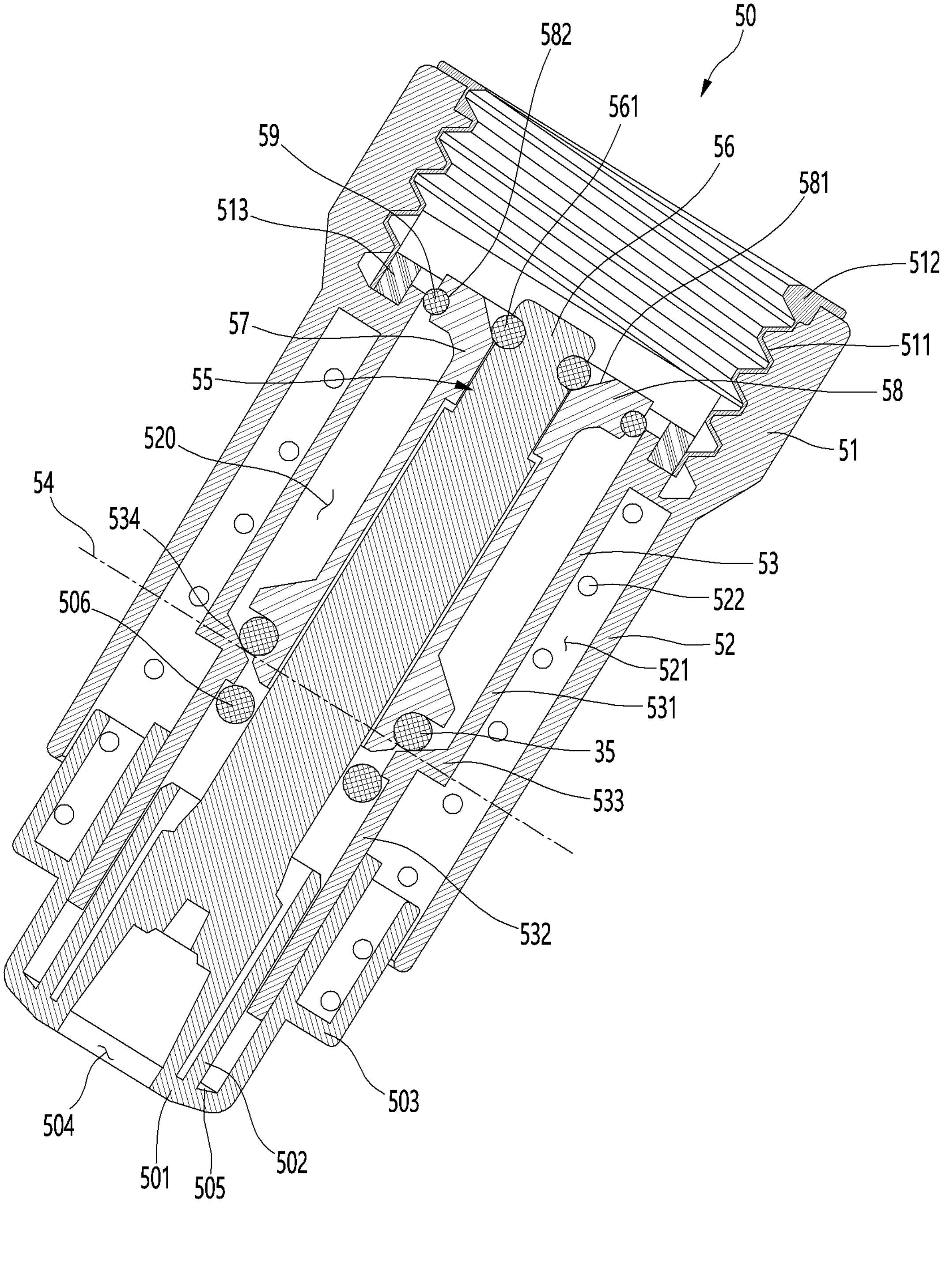
FIG. 4 is a side sectional view illustrating a water take-out valve according to an embodiment of the present disclosure.
Figure 5:
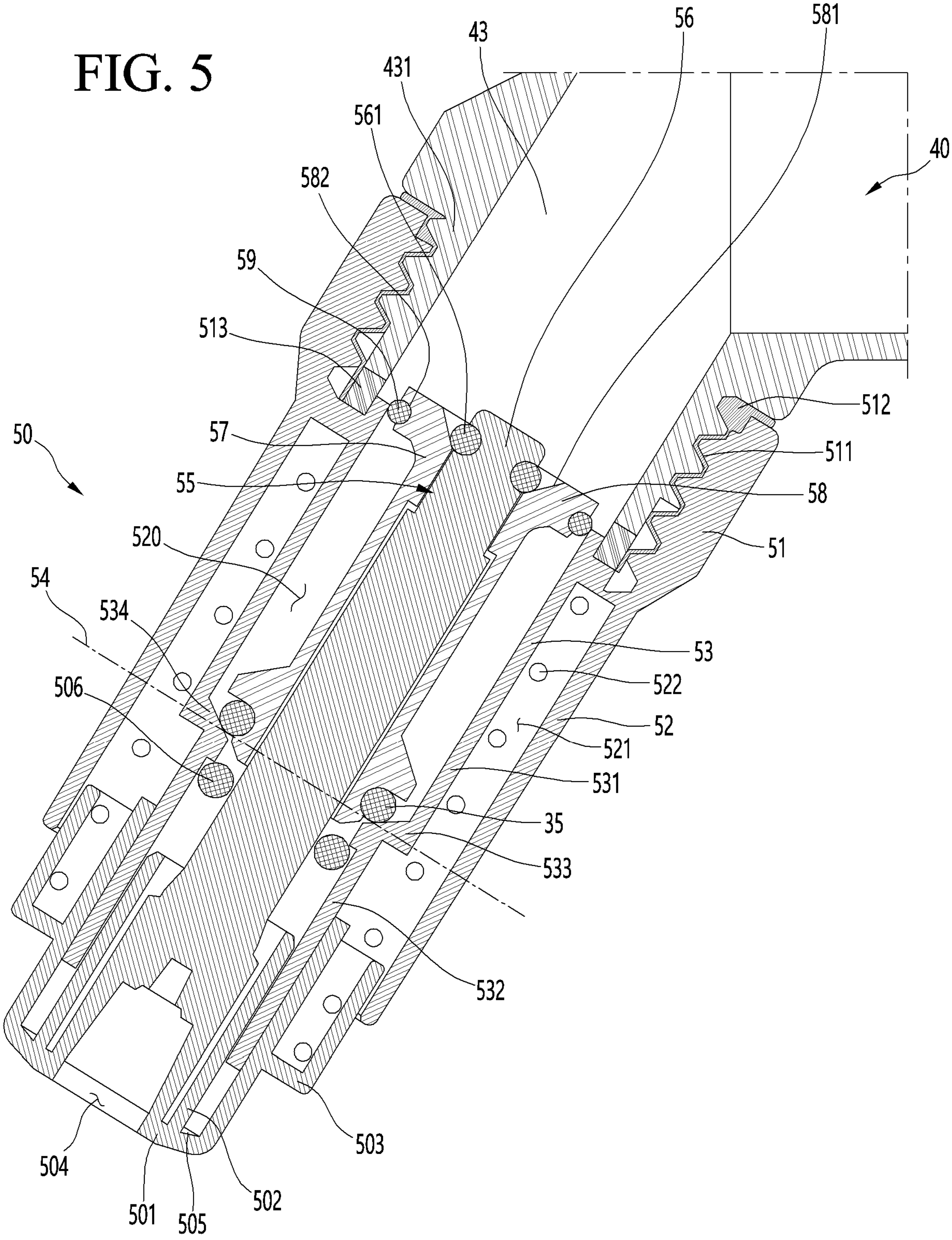
FIG. 5 is a side sectional view illustrating a state where the water tank and the water take-out valve are fastened.
Figure 6:
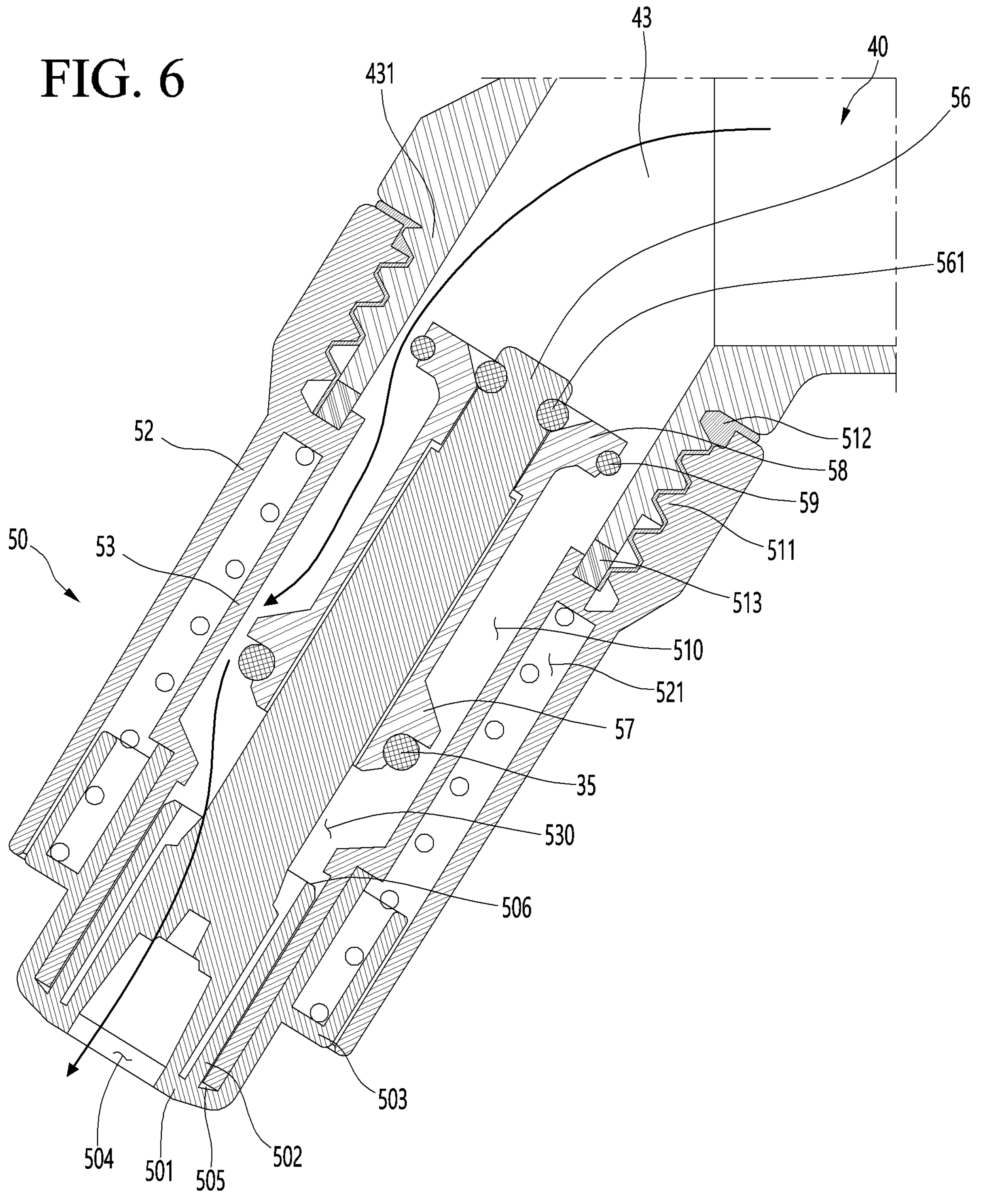
FIG. 6 is a cross-sectional view illustrating a state where the water take-out valve is opened.

FIG. 4 is a side sectional view illustrating a water take-out valve according to an embodiment of the present disclosure, FIG. 5 is a side sectional view illustrating a state where the water tank and the water take-out valve are fastened, FIG. 6 is a cross-sectional view illustrating a state where the water take-out valve is opened.

The water take-out valve 50 of the present disclosure includes a valve body 55 provided inside the piping part 51 serving as a passage through which water of a water tank flows.

A fastening part 511 into which the drain port 43 of the water tank 40 is inserted is formed inside the pipe part 51.

In addition, a sealing part 512 that is in surface contact with the fastening part 511 is provided inside the pipe part 51. The sealing part 512 may be provided between the valve coupling part 431 and the fastening part 511. In other words, the valve coupling part 431 and the coupling part 511 may be spaced apart from each other by the sealing part 512.

The sealing part 512 may be formed of an elastically deformable rubber or silicone material and may be configured to be fixed between the fastening part 511 and the valve coupling part 431 by an interference fit method, adhesion, or mating.

One surface of the sealing part 512 in contact with the valve coupling part 431 may be formed in a shape to mate with the valve coupling part 431. In addition, the other surface of the sealing part 512 in contact with the fastening part 511 may be formed in a shape to mate with the fastening part 511.

The sealing part 512 may extend from an end portion to the other end portion of the fastening part 511. In addition, the sealing part 512 may extend from an end portion to the other end portion of the valve coupling part 431.

The sealing part 512 may extend to contact a portion of the compression ring 513.

With this structure, the sealing part 512 may block direct conduction of heat from the drain port 43 cooled by the temperature of the water stored in the water tank 40 to the valve body 55. In other words, it is possible to prevent the heat of the water tank 40 cooled by water from being directly transmitted to the valve body 55, that is, the pipe part 51 by the sealing part 512. Accordingly, it is possible to prevent the temperature of the valve body 55 from being lowered by the temperature of the water, and thus it is possible to prevent dew condensation around the pipe part.

In addition, at the lower end portion of the fastening part 511, when the drain port 43 and the pipe part 51 are fastened, a compression ring 513 for sealing between the end portion of the drain port 43 and the end portion of the pipe part 51 may be provided.

Since the compression ring 513 has a rectangular cross section, it can be sealed even if there is a slight difference in size and shape between the end portion of the drain port 43 of the water tank 40 and the end portion of the pipe part 51.

The water take-out valve 50 is provided with an outer wall 52 extending from the pipe part 51 and forming a portion of the outer surface of the water take-out valve 50 and an inner wall 53 spaced apart from the outer wall 52 and having a smaller diameter than the outer wall 52. In addition, the hollow portion 521 defined by the interval between the inner wall 53 and the outer wall 52 may be provided below the compression ring 513.

An elastic body 522 such as a compression coil spring is installed in the hollow part 521, wherein the elastic body 522 elastically supports the valve body 55 with respect to the pipe part 51 in a direction in which the valve body 55 is pushed. When the take-out lever 32 is pressed by the user, the force that the user presses on the take-out lever overcomes the elastic force of the elastic body 522 and the valve body 55 is inserted toward the pipe part 51. Then, when the user releases the force pressing the take-out lever by completing water intake or the like, the valve body 55 slides toward the end portion of the pipe part by the elastic body 522.

The inner wall 53 may be formed to extend further inward than the position in which the compression ring 513 is provided in the inner space of the water take-out valve 50.

The inner wall 53 may be partitioned into a first inner wall 531 positioned above the reduced diameter part 533 and a second inner wall 532 positioned lower than the first inner wall 531. An inner diameter of the first inner wall 531 may be larger than an inner diameter of the second inner wall 532.

The reduced diameter part 533 may have an inclination such that the diameter gradually decreases as it moves downward along the length direction of the pipe part 51. In addition, the reduced diameter part 533 may have an inclined surface 534 to be in close contact with the opening and closing ring 35 of the valve body, which will be described later.

In addition, an outer insert ring 506 may be selectively fitted to the inner wall part of the reduced diameter part 533.

Meanwhile, an outer insert part 503 of the valve body may be inserted into the space between the second inner wall 532 and the outer wall 52.

The valve body 55 according to an embodiment of the present disclosure is fitted to the pipe part 51 and slides along the longitudinal direction of the pipe part 51 to open and close the opening and closing surface 54.

The valve body 55 includes a second valve body 57 inserted into a second inner wall 532 from an end portion of the pipe part 51, and a first valve body 56 inserted into the second valve body 57. In addition, a coupling ring 561 for sealing a gap generated between the first and second valve bodies 57 may be provided.

The second valve body 57 has two or more blade shapes projecting radially, and the end portion of the blade cooperates with the inner wall surface of the first inner wall 531 to guide the sliding movement of the valve body.

The second valve body 57 has an extension part 58 formed at an end portion adjacent to the drain port 43. The extension part 58 may be formed on the second valve body at a position corresponding to the position where the coupling ring 561 is provided. The extension part 58 may extend from an end portion of the second valve body in a direction away from the center of the first valve body 56. In other words, the extension part 58 may extend from the end portion of the second valve body in the direction of the fastening part 511.

The extension part 58 serves to block the movement of water in the water tank 40 into the valve body 55 in a state where the user does not press the take-out lever 32.

In other words, the extension part 58 prevents water from circulating in the space between the pipe part 51 and the inner wall 531 in a state where the opening and closing surface 54 is closed. Accordingly, it is possible to prevent the temperature from being lowered by the water circulating in the space between the pipe part 51 and the inner wall 531, thereby preventing the formation of dew condensation around the valve body 55.

The extension part 58 may further include an inclined part 581 in contact with the coupling ring 561. The inclined part 581 is formed to have a cross-sectional area gradually increasing toward the end portion, so that one side of the coupling ring 561 can be supported.

The extension part 58 may be formed with a predetermined distance from the inner surface of the drain port 43 in a state where the valve coupling part 431 and the fastening part 511 are coupled.

In addition, a groove 582 recessed in the center direction of the first valve body 56 is formed on one surface of the extension part 58. A leak prevention ring 59 for sealing a gap between the drain port 43 and the valve body 55 may be provided in the groove 582. In other words, in a state where the leak prevention ring 59 is mounted in the groove 582 of the extension part 58, a portion of the leak prevention ring 59 has a structure in close contact with the first inner wall 531.

Meanwhile, when the user presses the take-out lever 32 to move the valve body 55 toward the inside of the drain port 43, the extension part 58 and the leak prevention ring 59 are moved together with the second valve body 57 to have a structure that is spaced apart from the inner wall of the pipe part 51. Accordingly, the water stored in the water tank 40 may flow into the valve body 55 through the pipe part 51.

With a structure like this, the leak prevention ring 59 may seal between the inner wall 53 and the second valve body 57 when the valve body 55 slides. Accordingly, in a state where the user does not press the take-out lever 32, the water inside the water tank 40 flows into the pipe part 51 and thus can block the inflow of water into the space 520 between the second valve body 57 and the first inner wall 531.

In addition, as the valve body 55 slides, it is possible to prevent water from flowing into and circulating into the space 520, thereby preventing the formation of dew condensation around the valve body 55.

Meanwhile, the opening/closing ring 35 is fitted in the portion where the second valve body 57 faces the inclined surface 534 of the reduced diameter part 533 to be in close contact with the inclined surface 534 and in close contact with the opening and closing surface 54.

At the end portion of the valve body 55, a cover surface 501 covering the end portion, a rib 502 extending inwardly along the longitudinal direction of the pipe part from the inside of the inner wall 53 of the pipe part, and an outer insert part 503 extending inwardly along the longitudinal direction of the pipe part between the inner wall 53 and the outer wall is provided.

The cover surface 501 may be formed to be generally flat, and a water take-out port 504 through which water is discharged may be provided in a central portion of the cover surface 501.

In addition, the rib 502 may be formed to extend from the cover surface 501 in the longitudinal direction of the pipe part 51.

Further, in the present disclosure, a drain passage for lowering the pressure of water flowing into the space between the outer wall surface of the second inner wall 532 and the inner wall surface of the an outer insert part 503 may be further provided. The drain passage may be a cutout 505 that passes through the cover surface between the rib 502 and the outer insert part 503 and is connected to the water take-out port 504 of the cover surface.

The cutout 505 serves to relieve the water pressure formed in the space between the rib 502 and the an outer insert part 503, and serves to allow the water flowing out from the space between the rib 502 and the outer insert part 503 to merge with the main stream in order to relieve the water pressure.

Hereinafter, the operating principle of the water take-out valve will be described in detail.

A compression coil spring, which is an elastic body, is installed in the hollow part 521, and the elastic body elastically supports the valve body 55 in a direction in which the valve body 55 is pushed by the pipe part 51. In other words, in the normal state where the take-out lever 32 is not pressed, the elastic body 522 pushes the valve body. The end portion of the elastic body 522 is supported by the seating groove 582, and the elastic force of the elastic body pushes the outer insert part 503 outward. The outer insert part 503 is a portion which is integral with the first valve body 56, and the first valve body 56 may maintain a state of being pressed outward by the elastic force of the elastic body 522. In addition, the force of the first valve body 56 is transmitted to the first valve body 56 through a coupling ring 561, and the coupling ring 561 may seal a gap between the first valve body 56 and the second valve body 57.

In addition, the second valve body 57 is pressed to the outside, and the opening and closing ring 35 is in close contact with the inclined surface 534 of the pipe part 51 to seal the opening and closing surface 54.

Meanwhile, when the take-out lever 32 is pressed by the user, the valve body 55 is pressed by the force of the user pressing the take-out lever 32. In other words, the force that the user presses the take-out lever 32 overcomes the elastic force of the elastic body 522 to insert the valve body 55 toward the pipe part 51. Then, as the opening and closing surface 54 is opened, water in the upstream 510 flows out into the front chamber part 530 through the opening and closing surface 54, and the water flowing into the front chamber part 530 is discharged to the outside through the water take-out port 504.

After that, when the user releases the force pressing the take-out lever 32 by completing water take-out, The valve body 55 slides toward the end portion of the pipe part 51 by the elastic body 522, that is, toward the outside. In this state, the front chamber part 530 is isolated from the external space except for the water take-out port 504.

At this time, the water flowing from the water tank 40 to the drain port 43 does not flow in the space 520 between the inner wall 53 of the pipe part 51 and the valve body 55 by the leak prevention ring 59 and stays on the fastening part 511. In other words, in a state where the opening and closing surface 54 is closed by the valve body 55, by the extension part 58 and the leak prevention ring 59 provided on the extension part 58, it is possible to block water from flowing into the space between the inner wall 53 and the valve body 55. In detail, by means of the extension part 58 and the leak prevention ring 59 provided on the extension part 58, it is possible to block the inflow of water into the space between the upper end of the valve body 55 and the opening and closing surface 54. In other words, the water stored in the water tank 40 by the leak prevention ring 59 stays in the inner space of the valve coupling part 431, and the space 520 formed by the valve body 55, the pipe part 51, and the opening and closing surface 54 is maintained in a sealed state so that water does not flow into the space.

Accordingly, in a state where the opening and closing surface 54 is closed, water stored in the water tank 40 flows into the water take-out valve 50 to prevent the temperature of the water take-out valve 50 from being lowered by the water. In addition, it is possible to minimize water retention in the water take-out valve 50, thereby ultimately preventing dew condensation from occurring around the water take-out valve 50.

In addition, direct contact with the drain port 43 can be prevented by the sealing part 512 provided on the fastening part 511 of the pipe part 51. In other words, it is possible to maintain a predetermined distance between the fastening part 511 and the drain port 43 by the sealing part 512. Accordingly, the sealing part 512 serves as a buffer so that the heat of the drain port 43 is not directly conducted to the fastening part 511. With this structure, the water take-out valve 50 can minimize the influence of the temperature of the water tank 40 cooled by the cold air, thereby preventing the formation of dew condensation around the water take-out valve 50.

Meanwhile, in the refrigerator according to an embodiment of the present disclosure, a heating wire may be provided at a portion where the water take-out valve is inserted into the rear surface of the door.

Figure 7:
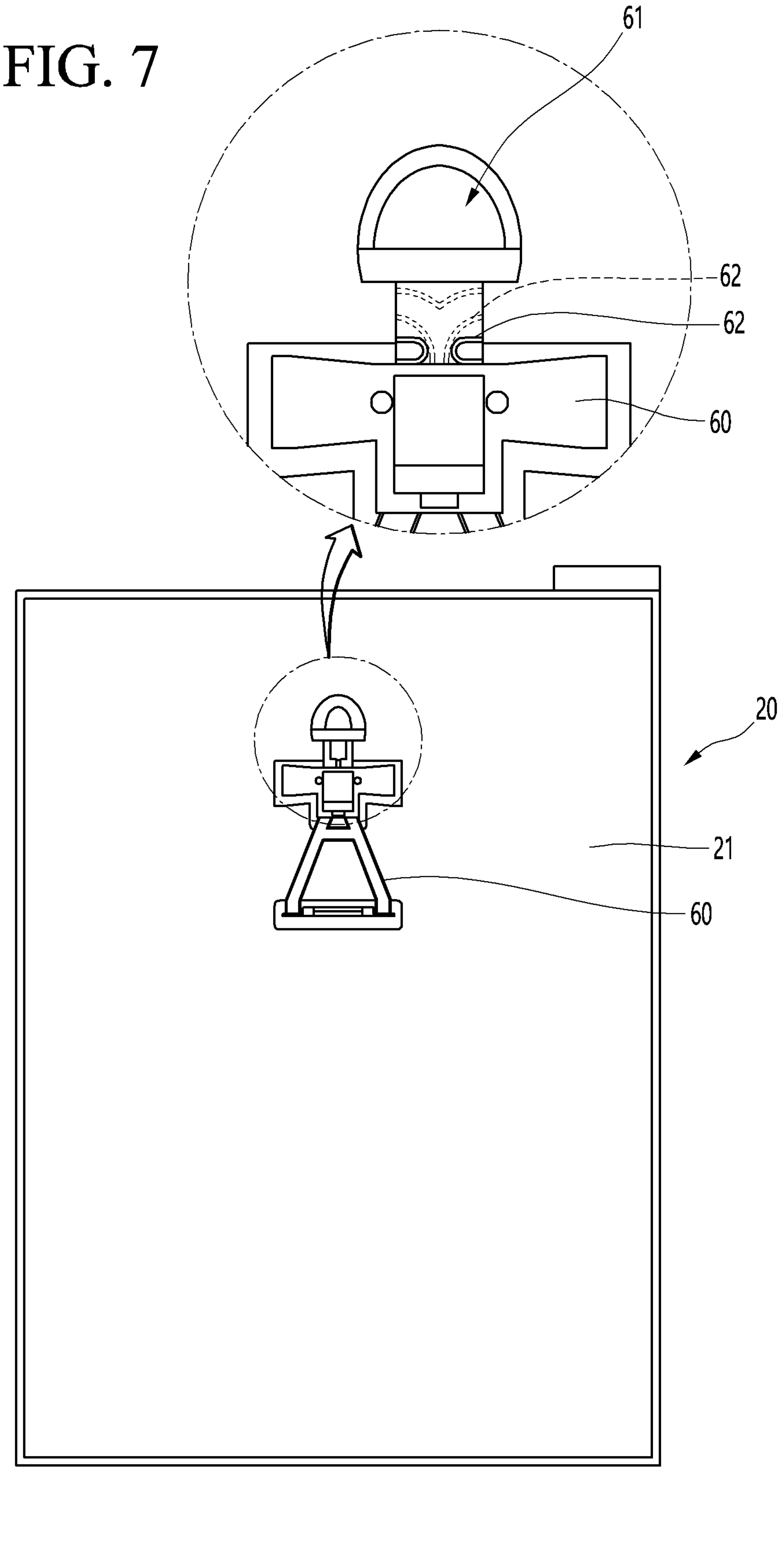
FIG. 7 is a view illustrating a state where a heating wire is mounted on the dispenser according to an embodiment of the present disclosure.

FIG. 7 is a view illustrating a state where a heating wire is mounted on the dispenser according to an embodiment of the present disclosure.

The door 20 includes a front plate 21 forming an outer appearance of the front surface and a door liner forming a rear surface.

A dispenser fixing part 60 formed to support a portion of the dispenser 30 is provided on the rear surface of the front plate 21.

A connector 61 into which the water take-out valve 50 is inserted is provided above the dispenser fixing part 60, so that the drain port 43 of the water tank 40 and the water take-out valve 50 communicate with each other.

In addition, a heating wire 62 capable of preventing dew condensation may be provided on the outer circumferential surface of the connector 61. In other words, by attaching the heating wire 62 to the outer circumferential surface of the connector 61, it is possible to increase the temperature of the circumferential portion of the connector 61, thereby preventing dew condensation from occurring around the connector 61 due to the water with a lower temperature.

The heating wire 62 is provided in a structure surrounding the outer circumferential surface of the connector 61, and the temperature around the connector 61 is lowered by water passing through the valve body 55, thereby preventing dew condensation from occurring.

The heating wire 62 is buried by an adiabatic material that insulates between the front plate 21 and the door liner to prevent exposure to the outside.

An object of the present disclosure is to provide a refrigerator including a dispenser capable of preventing dew condensation from forming around a valve body connected to a water tank.

An object of the present disclosure is to provide a refrigerator capable of preventing the residual water from falling by minimizing the amount of water remaining in a valve body.

Technical Solution

A refrigerator according to an embodiment of the present disclosure includes a cabinet configured to form a storage space, a door configured to open and close the storage space, a dispenser configured to be formed on a front surface of the door, a water tank configured to be provided detachably from the door above the dispenser and including a drain port for discharging stored water, a pipe part configured to communicate with the water tank to form a passage for discharging water, and a water intake valve including a valve body that slides along the longitudinal direction of the pipe part and opens and closes an opening and closing surface of the pipe part, in which the valve body includes an extension part configured to extend from one surface of the valve body toward an inner surface of the passage, and a leak prevention ring configured to be provided around the extension part to seal between the pipe part and the valve body in a state where the opening and closing surface is closed by the valve body.

The pipe part may include an outer wall configured to form a part of an outer surface of the water intake valve, and an inner wall provided to be spaced apart from the outer wall and having a smaller diameter than the outer wall, in which the leak prevention ring may be formed to be in contact with the inner wall when the opening and closing surface is closed by the valve body.

The leak prevention ring may be provided at an upper end of the valve body to block water from the drain port from flowing into a space between the pipe part and the valve body.

The valve body may include a first valve body inserted into the inner wall and slidingly moved in the longitudinal direction of the pipe part, and a second valve body formed along the circumferential surface of the first valve body and formed to be in contact with a portion of the inner wall, and the extension part may extend from one surface of the second valve body in a direction of the pipe part.

A groove recessed in the central direction of the valve body may be formed on the outer surface of the extension part, and the leak prevention ring may be mounted in the groove.

The leak prevention ring may be provided to be spaced apart from the inside of the drain port at a predetermined interval.

The valve body may include a coupling ring configured to seal a gap between the first valve body and the second valve body, and the extension part may be formed to have a cross-sectional area that increases from the center of the valve body toward the inner wall and includes an inclined part configured to be in contact with the coupling ring.

The upper end of the extension part may be positioned on the same extension line as the coupling ring.

A fastening part into which the drain port is inserted may be provided in the upper end of the inside of the drain port, and a sealing part spaced apart between the fastening part and the drain port may be provided in the fastening part.

The sealing part may extend along the longitudinal direction of the fastening part and may be in surface contact with the drain port.

The sealing part may be made of elastically deformable rubber or silicone material.

A compression ring sealing the end portion of the drain port may be provided in one end of the fastening part, and the sealing part may be provided to be in contact with a portion of the compression ring.

The pipe part and the valve body may be provided in the refrigerator door, a take-out lever may be installed on the door, and the force for pressing one side of the take-out lever may be transmitted to the valve body so that the valve body opens the opening and closing surface of a pipe part.

The door may include a front plate configured to form an outer appearance of a front surface, a door liner configured to form a rear surface, and a dispenser fixing part formed to support a portion of the dispenser on the rear surface of the front plate, in which a connector into which the water intake valve is inserted may be provided above the dispenser fixing part.

A heating wire may be attached to the outer circumferential surface of the connector.

Advantageous Effect

The refrigerator according to the embodiment of the present disclosure can expect the following effects.

The present disclosure includes an extension part extending in the direction of the inner wall of the pipe part from the upper end of the valve body, and a leak prevention ring mounted around the extension part. Accordingly, in a state where the opening and closing surface of the pipe part is closed by the valve body, it is possible to maintain a sealed state between the pipe part and the valve body. Accordingly, water flowing through the drain port of the water tank may be blocked by the leak prevention ring, thereby preventing the water from flowing into the pipe part.

Since water is not circulated inside the pipe part in a state where the opening and closing surface of the pipe part is closed by the leak prevention ring, it is possible to prevent the temperature inside the water take-out valve from being lowered by the temperature of the water. Accordingly, it is possible to prevent dew condensation from occurring around the water take-out valve.

In addition, the present disclosure is characterized in that a sealing part is provided inside the pipe part into which the drain port is inserted. The sealing part may separate the drain port inserted into the pipe part by a predetermined distance from the pipe part. Accordingly, it is possible to prevent direct conduction of heat from the drain port, whose temperature is lowered by the water in the water tank, to the pipe part. Thereby, it is possible to prevent dew condensation from occurring around the pipe part.

Also, in the present disclosure, a heating wire may be provided on an outer circumferential surface of a connector which is formed on the door and into which the water take-out valve is inserted. Accordingly, it is possible to prevent a temperature difference between the inside and outer surfaces of the door from occurring due to the water flowing through the water take-out valve. Accordingly, it is possible to prevent dew condensation from occurring around the connector and the door.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
- a cabinet to form a storage space;
- a door to open and close the storage space;
- a dispenser to be disposed on the door;
- a water tank to be detachably disposed from the door, and the water tank including a drain port to discharge water from the water tank;
- a pipe component to provide a passage for discharging water from the water tank; and
- a valve body configured to move in a longitudinal direction within the pipe component to open and close an opening and closing surface of the pipe component,
- wherein the valve body includes:
  - a body extension to extend from the valve body toward an inner surface of the passage; and
  - a leak prevention ring to be provided around the body extension and configured to provide a seal between the pipe component and the valve body when the opening and closing surface is closed by the valve body
- wherein the pipe component includes:
  - an outer wall to form part of an outer surface; and
  - an inner wall spaced apart from the outer wall and having a smaller diameter than the outer wall, wherein the leak prevention ring is to contact with the inner wall when the opening and closing surface is closed by the valve body,
- wherein the valve body includes:
  - a first valve body to be inserted within the inner wall and to move in the longitudinal direction within the pipe component; and
  - a second valve body disposed along a circumferential surface of the first valve body, and the second valve body to contact a portion of the inner wall, and
  - wherein the body extension extends from the second valve body in a direction toward the pipe component,
  - wherein the valve body includes a coupling ring to seal a gap between the first valve body and the second valve body, and
- wherein the body extension is to have a cross-sectional area that increases from a center of the valve body toward the inner wall and includes an inclined part to be in contact with the coupling ring.

2. The refrigerator of claim 1, wherein the leak prevention ring is provided at an upper end of the valve body, and is configured to block water from the drain port from flowing into a space between the pipe component and the valve body.

3. The refrigerator of claim 1, wherein an upper end of the body extension is positioned on a same extension line as the coupling ring.

4. The refrigerator of claim 1, comprising a groove disposed on an outer surface of the body extension, and wherein the leak prevention ring is disposed in the groove.

5. The refrigerator of claim 1, wherein the leak prevention ring is to be spaced apart from an inside of the drain port at a predetermined interval.

6. The refrigerator of claim 1, wherein the pipe component includes a fastening part to receive an end of the drain port, and
- wherein the pipe component includes a sealing part at an end of the pipe component, and the sealing part is spaced between the fastening part and the drain port.

7. The refrigerator of claim 6, wherein the sealing part extends along a longitudinal direction of the fastening part and is in surface contact with the drain port.

8. The refrigerator of claim 6, wherein the sealing part is made of elastically deformable rubber or silicone material.

9. The refrigerator of claim 1, wherein the pipe component and the valve body are provided at the door,
- wherein a take-out lever is provided at the door, and
- wherein the take-out lever is configured to receive a pressing force which is transmitted to the valve body to open the opening and closing surface.

10. The refrigerator of claim 9, wherein the door includes:
- a front plate configured to provide an outer appearance of a front surface of the door,
- a door liner configured to provide a rear surface of the door; and
- a dispenser fixing component disposed on the rear surface of the door to support a portion of the dispenser, wherein a connector is disposed above the dispenser fixing component and is configured to receive the drain port.

11. The refrigerator of claim 10, comprising a heating wire to couple to an outer surface of the connector.

12. A refrigerator comprising:
- a cabinet to form a storage space;
- a door to open and close the storage space;
- a dispenser to be disposed on the door;
- a water tank to be detachably disposed from the door, and the water tank including a drain port to discharge water from the water tank;
- a pipe component to provide a passage for discharging water from the water tank; and
- a valve body configured to move in a longitudinal direction within the pipe component to open and close an opening and closing surface of the pipe component, wherein the valve body includes:
  - a body extension to extend from the valve body toward an inner surface of the passage;
  - a leak prevention ring to be provided around the body extension and configured to provide a seal between the pipe component and the valve body when the opening and closing surface is closed by the valve body; and a compression ring provided at an end of the sealing part to seal an end portion of the drain port;

wherein the pipe component includes a fastening part to receive an end of the drain port, and wherein the pipe component includes a sealing part at an end of the pipe component, and the sealing part is spaced between the fastening part and the drain port, and wherein the sealing part is in contact with part of the compression ring.

13. The refrigerator of claim 12, wherein the sealing part extends along a longitudinal direction of the fastening part and is in surface contact with the drain port.

14. The refrigerator of claim 12, wherein the sealing part is made of elastically deformable rubber or silicone material.

15. The refrigerator of claim 12, wherein the leak prevention ring is provided at an upper end of the valve body, and is configured to block water from the drain port from flowing into a space between the pipe component and the valve body.

16. The refrigerator of claim 12, comprising a groove disposed on an outer surface of the body extension, and wherein the leak prevention ring is disposed in the groove.

17. The refrigerator of claim 12, wherein the leak prevention ring is to be spaced apart from an inside of the drain port at a predetermined interval.

18. The refrigerator of claim 12, wherein the pipe component and the valve body are provided at the door, wherein a take-out lever is provided at the door, and wherein the take-out lever is configured to receive a pressing force which is transmitted to the valve body to open the opening and closing surface.

19. The refrigerator of claim 18, wherein the door includes:

a front plate configured to provide an outer appearance of a front surface of the door, a door liner configured to provide a rear surface of the door; and a dispenser fixing component disposed on the rear surface of the door to support a portion of the dispenser, wherein a connector is disposed above the dispenser fixing component and is configured to receive the drain port.

20. The refrigerator of claim 19, comprising a heating wire to couple to an outer surface of the connector.

* * * * *